United States Patent
Willman et al.

(10) Patent No.: US 6,529,966 B1
(45) Date of Patent: Mar. 4, 2003

(54) BOOTING A COMPUTER SYSTEM USING A LAST KNOWN GOOD SET OF CONFIGURATION DATA

(75) Inventors: Bryan M. Willman, Kirkland; Dan Alvin Hinsley, Issaquah; John David Vert, Seattle; David Otto Hovel, Redmond; Rita Mang Chee Wong, Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/518,852

(22) Filed: Aug. 24, 1995

Related U.S. Application Data

(63) Continuation of application No. 08/100,080, filed on Jul. 30, 1993.

(51) Int. Cl.[7] .................................................. G06F 9/00
(52) U.S. Cl. ............................................. 710/10; 713/1
(58) Field of Search .................. 395/700; 364/280.2, 364/975.2; 710/10; 713/1

(56) References Cited

U.S. PATENT DOCUMENTS

| | | | | |
|---|---|---|---|---|
| 4,070,704 A | * | 1/1978 | Calle et al. ................. | 395/700 |
| 4,403,303 A | * | 9/1983 | Howes et al. ............... | 364/900 |
| 4,491,914 A | | 1/1985 | Sujaku ....................... | 364/200 |

(List continued on next page.)

FOREIGN PATENT DOCUMENTS

| | | | | |
|---|---|---|---|---|
| EP | 0 364 127 | 4/1990 | ........... | G06F/9/445 |
| EP | 0 398 644 | 11/1990 | ........... | G06F/9/445 |
| EP | 0 419 004 | 3/1991 | ........... | G06F/9/445 |

OTHER PUBLICATIONS

Boling, MBoot.Com: A Multiple Boot Program for Tour PC, PC Magazine Feb. 26, 1991 V10, 74 p359(6).*
Brenesal, Getting Better with Age, Computer Shipper, 8/91 V11 N8 p470(2).*
Tolitz et al, The Initial Loot FileSystem, Porting, Unix to the 386, Dr. Dobb's Journal 5/91 V16 N5 p(46)(5).*
Tadashi, "System Forming Method," Hitachi, LTD., Patent Abstracts of Japan, Publication No. 63172338 A (Jul. 16, 1988).
Mitsuo et al., "System Starting–Up Method for Computer System," Fujitsu, LTD., Patent Abstract of Japan, Publication No. 63178357 A (Jul. 22, 1988).
Reference to Microsoft Word, (Version 5.0), Microsoft Corporation, 1989, "Undo," Chap. 1, "Commands–Edit Menu," pp. 90–92.
MS–DOS Version 5.0 User's Guide (Condensed Edition), Microsoft Corporation, 1991, "Configuring MS–DOS for Your System," Chap. 13, "Customizing Your System," pp. 137–144.

(List continued on next page.)

Primary Examiner—Majid A. Banankhah
(74) Attorney, Agent, or Firm—Leydig, Voit & Mayer LTD

(57) ABSTRACT

A method and system provides for booting a computer system after configuration data becomes unusable. One method and system provides for booting the computer system from a set of configuration data that last booted the system properly. An embodiment is directed to attempting to boot the computer system from a first set of configuration data, and, if the attempt is unsuccessful, automatically booting the computer system using the second set of configuration data which successfully booted the computer system and was previously stored. In response to a successful boot of the computer system using the first set of configuration data, an embodiment is directed to updating second set of configuration data so that it is equivalent to the first set of configuration data as the second set of configuration data that successfully booted the computer system.

14 Claims, 15 Drawing Sheets

U.S. PATENT DOCUMENTS

| | | | | | |
|---|---|---|---|---|---|
| 4,589,063 | A | * | 5/1986 | Shah et al. | 364/200 |
| 4,974,151 | A | * | 11/1990 | Advani et al. | 364/200 |
| 5,014,193 | A | * | 5/1991 | Garner et al. | 364/200 |
| 5,134,580 | A | * | 7/1992 | Bertram et al. | 395/650 |
| 5,237,689 | A | * | 8/1993 | Behnke et al. | 395/425 |
| 5,237,690 | A | * | 8/1993 | Bealkkowski et al. | 395/700 |
| 5,247,659 | A | * | 9/1993 | Curran et al. | 395/575 |
| 5,247,682 | A | * | 9/1993 | Kondou et al. | 395/700 |
| 5,257,368 | A | * | 10/1993 | Benson et al. | 395/600 |
| 5,261,104 | A | * | 11/1993 | Bertram et al. | 395/700 |
| 5,327,553 | A | * | 7/1994 | Jewett et al. | 395/575 |
| 5,412,798 | A | * | 5/1995 | Garney | 395/500 |
| 5,459,867 | A | * | 10/1995 | Adams et al. | 395/700 |

OTHER PUBLICATIONS

Woodcock, Joanne and Michael Halvorson, (eds.), Xenix At Work, Microsoft Press, Redmond, WA, 1986, cover and contents pages.

Woodcock, Joanne and Michael Halvorson, (eds.), Xenix At Work, Microsoft Press, Redmond, WA, 1986, Chap. 13, "Installing Xenix," pp. 265–285.

OS/2 2.0, Installation Guide, International Business Machines Corporation, 1992, pp. i–v.

OS/2 2.0 Installation Guide, International Business Machines Corporation, 1992, Chap. 1, "Choosing An Installation Procedure," pp. 1–8.

OS/2 2.0 Installation Guide, International Business Machines Corporation, 1992, Chap. 3, Adding OS/2 2.0 to a DOS System (Dual Boot), pp. 23–30.

OS/2 2.0 Installation Guide, International Business Machines Corporation, 1992, Chap. 4, Installing Multiple Operating Systems (Boot Manager), pp. 31–62.

OS/2 2.0, Installation Guide, International Business Machines Corporation, 1992, "Appendix B. Diagnosing System Problems," pp. 73–80.

OS/2 2.0, Installation Guide, International Business Machines Corporation, 1992, "Appendix C. Examples of Installing OS/2 2.0 and Partitioning Your Hard Disk," pp. 81–90.

* cited by examiner

Tree Structure for Control:
                206
\control
    \machine
        computername =
        timezone =
    \memory_management
        PagedPoolSize =
        NonPagedPoolSize =
        \PageFile
            \1
                Path = <nt path to paging file>
                Size = <size in megabytes>
            \2
                Path = <nt path to paging file>
                Size = <size in megabytes>

\program
        autocheck = \systemroot\windows\system\autochk.exe*
        autoconvert = \systemroot\windows\system\convert
            // the names under this key have no particular meaning
            // sm will execute the first token in the values, passing
            // the rest of the tokens as arguments.
            // the programs may be executed in any order sm wishes \KnownDll
        DllDirectory = @:\Windows\System
        Dll0 = base.dll
        Dll1 = basertl.dll
        Dll2 = gdi.dll
        Dll3 = user.dll
        Dll4 = console.dll
        Dll5 = userrtl.dll
        Dll6 = csr.dll
        Dll7 = dbgdll.dll
        Dll8 = elfapi.dll \Environment
        ComSpec = @:\windows\system\cmd.exe

. . .

\sm
        Debug = @:\windows\system\dbgss.exe

\lsa

\dos_devices
        lpt1 = \device\printer0
        prn = \device\printer0
        com1 = \device\serial0

. . .                    301
    \service_group_order
        list = "scsi_port\0scsi_mini_port\0"

*Figure 3*

Tree Structure for Services:
```
                     207
\services ╱
    \ub_adapter
         type = adapter
         \Parameters
              AdapterType = NIUpc/EOTP
              Memory window = D8000
              IoPort = 368
              Irql = 7
              // The value entries under the Parameters key are defined by
              // the drivers that use them, and may be arbitrary.
              // The Driver Config spec will offer conventions for them though.

\scsi_port
              start = boot
              type = kernel-driver
              group = scsi_port
              ErrorControl = Normal
                  . . .      ╲ 401
    \aha5454
              start = boot
              type = kernel-driver
              group = scsi_mini_port
              ErrorControl = Normal
                  . . .      ╲ 401
    \aha5458
              start = system
              type = driver
              group = scsi_mini_port
              ErrorControl = Normal
                             ╲ 401
```

*Figure 4*

\\<Node_Name>
   Security descriptor for Node_Name allows read/traverse/create subkey
   access to all, but restricts write and create access to System, and administrator
   (Means that services can be create child sub keys under which they set values,
   but cannot set or delete values immediately under the service node
   itself.)

Type = [KERNEL_DRIVER/FILE_SYSTEM_DRIVER/WIN32_OWN_PROCESS/WIN32_
SHARE_PROCESS/ADAPTER/RECOGNIZER_DRIVER]
   KERNEL DRIVER is a kernel device driver. FILE-SYSTEM-DRIVER is a File
   systems driver.
   WIN32_OWN_PROCESS and WIN32_SHARE_PROCESS are win32 programs that can be started by the
   service controller and which obeys the service control protocol.
   ADAPTER and RECOGNIZER_DRIVER are set of arguments for some piece of hardware.

Start = [BOOT / SYSTEM / AUTO / DEMAND / DISABLED]
Ignored for Type = ADAPTER and type = RECOGNIZER_DRIVER
   If type = WIN32_OWN_PROCESS or WIN32_SHARE_PROCESS Start must be
   one of AUTO,DEMAND,DISABLED.
     BOOT means that this node represents a part of the driver stack
       for the boot volume, and must therefore be loaded by os loader
       using the ARC facility (or x86 equiv.)
     SYSTEM means that this node represents a driver to be loaded in
       IoInitSystem.
     AUTO means that this node, regardless of type, is to be loaded or
       started by the service controller, automatically for all boots.
     DEMAND means that this node, regardless of type, is available,
       but will not be started until the service controller is called to
       start it.
     DISABLED means that this node is not to be started under any
       conditions.

ImagePath = <pathname>
   Ignored for type = ADAPTER and type = RECOGNIZER_DRIVER
   Default is <sysroot> \ driver \ <node_name>.sys for type Driver.
   The path is relative to the system root, unless it begins with\,
     in which case is a fully qualified ARC path for Start = BOOT, a
     fully qualified NT path for Start = SYSTEM, or a fully qualified
     NT or Win path for any other value of Start.

ObjectName = <objectname>
   Ignored for type! = ADAPTER and Type = RECOGNIZER_DRIVER
   Default is "\driver \ <node_name>". Is an NT object manager path
     which specifies the name of the driver object. if Type = KERNEL_DRIVER.
   Default is: \FileSystem \ <node_name> if type = FILE_SYSTEM_DRIVER which specified the name
   of the file system object
   Default is:LocalSystem if Type = WIN32_OWN_PROCESS or Type = WIN32_SHARE_PROCESS
401  which specifies the account name for the service process to run with.
   ErrorControl = [CRITICAL \ SEVERE \ NORMAL IGNORE]
   IGNORE boot should proceed if the node fails to load or initialize, but user is not notified of failure.
     NORMAL boot should proceed if the node fails to load or initialize.
       SEVERE if boot is not based on Last Known Good control set,
         fail it (i.e. Switch to Last Known Good and try again.)
        If this is a Last Known Good attempt, press on in case of
         error.
       CRITICAL fail boot. If not Last Known Good, try Last Known Good.
         If boot is Last Known good, bugcheck.

Figure 5

You may now select to boot the system using the Last Known Good configuration. If you chose to boot from the Last Known Good configuration, any configuration changes since the system was last successfully booted will be lost.

Use Current Configuration
    Use Last Known Good Configuration
    Reboot

Use the up and down arrow keys to make your selection. Please press enter when you have made your selection.

*Figure 15*

BOOTING A COMPUTER SYSTEM USING A LAST KNOWN GOOD SET OF CONFIGURATION DATA

CROSS-REFERENCE TO RELATED APPLICATION

This application is a continuation of U.S. patent application Ser. No. 08/100,080, filed Jul. 30, 1993, now abandoned.

TECHNICAL FIELD

This invention relates generally to a method and system for booting a computer, and more specifically, to a method and system which ensures that the boot-up procedure will always be successful.

BACKGROUND OF THE INVENTION

When a user starts a personal computer system, the computer system goes through a complex set of operations to make sure that all of its components are working properly. This operation is but the first step in an even more complicated process called the system boot-up procedure (i.e., the boot). Booting the system activates all of the computer system's components long enough to load an operating system. The operating system is a computer program that allows the computer system to use other computer programs. Before attempting to load the operating system, the computer system insures that the system's input-output hardware, central processing unit, and main memory are all functioning. This is accomplished through the use of a power-on self-test, or Post.

After the Post checks all of the hardware components of the computer system, a boot program contained in the computer's ROM BIOS chips checks drive A of the computer to see if drive A contains a formatted floppy disk. If a formatted floppy disk is positioned in drive A, then the boot program loads the first sector of the disk into memory and executes it. If there is no formatted floppy disk in drive A, then the first sector on the first hard drive is loaded into memory and executed.

The first sector on the hard drive contains a program that reads the partition table of the hard drive and determines which partition is marked active. The first sector from the active partition is then loaded into memory and executed.

The first sector on the active partition or floppy disk contains a program that searches for files that comprise the first files of the operating system. On most personal computer systems, the files are named IO.SYS and MSDOS.SYS. On IBM computers, the two files are named IO.SYS and IBMDOS.COM. For purposes of this discussion, it will be assumed that the two system files are IO.SYS and MSDOS.SYS. IO.SYS provides a low level interface to the ROM BIOS device routines. MSDOS.SYS is the DOS program itself and provides a high-level interface for user programs. It consists of file management routines, data blocking/deblocking for the disk routines, and a variety of built-in functions easily accessible by user programs. When these function routines are invoked by a user program, they accept high-level information via register and control block contents, then translate the requirements into one or more calls to IBMBIO.COM to complete the request.

The boot record takes control of the computer system and loads the two operating system files into memory. The IO.SYS file contains extensions to the ROM BIOS and includes a routine called SYSINIT that manages the rest of the system boot procedure. After loading IO.SYS, the boot record is replaced in memory by other program code, and SYSINIT assumes control of the system boot procedure. In doing so, SYSINIT loads MSDOS.SYS into memory. SYSINIT then searches the root directory of the computer memory for a file named CONFIG.SYS. If CONFIG.SYS exists in the computer system, then SYSINIT requests that MSDOS.SYS execute the commands in the CONFIG.SYS file. CONFIG.SYS is a file created by the computer user and contains commands which tell the operating system how to handle certain operations, such as how many files may be opened at one time, and how many system buffers may be used at any one time. CONFIG.SYS also contains instructions to load device drivers. A device driver is a program that the operating system uses to control hardware that communicates with the computer system. For example, MS-DOS uses a device driver to control how information is written to and read from a floppy disk drive. MS-DOS also has built-in device drivers for the computer system keyboard, monitor, hard drives, and communication ports.

Next, SYSINIT tells MSDOS.SYS to load the file COMMAND.COM. One function of COMMAND.COM is to search the root directory of the computer memory for a file named AUTOEXEC.BAT. AUTOEXEC.BAT is a file created by the computer user and contains a series of MS-DOS batch file commands and/or the names of programs that the user wants to run each time the computer system is actuated. Typically, the computer system is now fully booted and ready to be used.

However, as new hardware components are added to the computer system or as user needs change, it becomes necessary to modify the two user created system boot files, CONFIG.SYS and AUTOEXEC.BAT. Prior art systems allow the user to add and change CONFIG.SYS commands or AUTOEXEC.BAT commands to configure the computer system to suit the user's needs. To edit the CONFIG.SYS file, the MS-DOS editor or a text editor that saves files as unformatted (ASCII text) is typically used. Once the changes to the CONFIG.SYS file or the AUTOEXEC.BAT file have been completed, the user must restart the computer system in order to have the changes take effect because MS-DOS reads the CONFIG.SYS file and the AUTOEXEC.BAT file only during the boot-up procedure (i.e., when the computer system is started).

Occasionally, the changes to the CONFIG.SYS file or the AUTOEXEC.BAT file will cause the computer system to "hang" (i.e., not boot) in a way that prevents the user from editing, and therefore correcting, the system boot files. For example, in some cases where the system boot files are unusable, the device driver for the computer system's hard drive cannot be loaded. Therefore, the system boot files stored on the hard drive cannot be accessed or edited. In order to overcome this deadlock the user must load an operating system such as MS-DOS from a floppy diskette. The user then edits the system boot files using the operating system editor and attempts to reboot the computer system using the edited system boot files on the hard drive. This process continues until the computer system is successfully booted.

It would be desirable to have a computer system which automatically boots even if some configuration data has become unusable so that the user of the computer system can access the system boot files without the need of loading additional files from external storage medium.

SUMMARY OF THE INVENTION

The present invention provides a method and system to boot a computer system even after some configuration data has become unusable. This is accomplished by a method and system for booting the computer system from a set of configuration data that last booted the system properly. The present invention first attempts to boot the computer system from a current set of configuration data. If the attempt is unsuccessful, the present invention automatically boots the computer system using the last set of configuration data which successfully booted the computer system and which was previously stored. In response to a successful boot of the computer system using the last set of configuration data that properly booted the computer system, the present invention makes a new current set of configuration data that is equivalent to the last set of configuration data that successfully booted the computer system.

If the attempt to boot from the current set of configuration data is successful, the present invention stores it as the last set of configuration data that successfully booted the computer system.

BRIEF DESCRIPTION OF THE DRAWINGS

FIG. 3 is a preferred tree structure for a Control subkey of the System hive.

FIG. 4 is a preferred tree structure for a Services subkey of the System hive.

FIG. 5 shows a preferred structure of a node under the Services subkey of the System hive.

FIG. 15 is a block diagram of a preferred LastKnown-Good user interface menu.

DETAILED DESCRIPTION OF THE INVENTION

Figure 1:
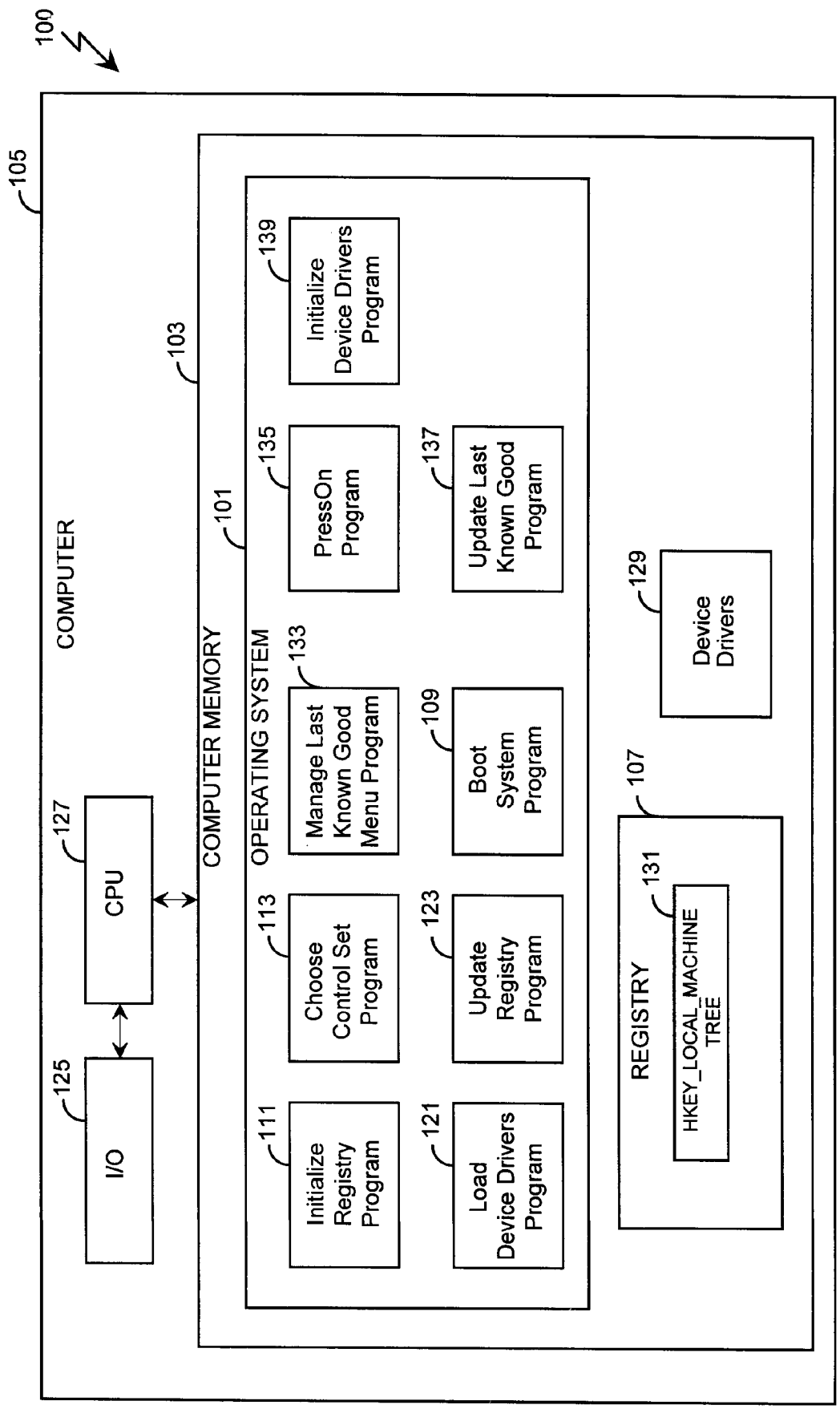
FIG. 1 is a block diagram of a system embodying the present invention for booting a computer system.

The present invention provides a method and system for successfully booting a computer system 100 (FIG. 1) even after some configuration data has become unusable. For illustrative purposes, the present invention will be described as residing in the Windows NT™ operating system of Microsoft Corporation, Redmond, Wash. The components of a preferred operating system 101, all of which are preferably stored in a computer memory 103, boot a computer 105 (i.e., "the system") using configuration data stored in a registry 107. Before discussing the operation of the present invention in detail, it will be helpful to understand how configuration data is preferably stored within the computer system 100 of FIG. 1.

The Registry

The registry 107 is a unified and centralized data base for storing operating system, application, and hardware configuration data. The registry 107 preferably stores this data in a hierarchical form which supports multiple users. Thus, the registry 107 eliminates the need for multiple configuration files such as AUTOEXEC.BAT, CONFIG.SYS, and other such configuration data files.

The registry 107 is preferably structured as a tree. The preferred tree of the registry 107 is named: HKEY_LOCAL_MACHINE Tree 131 (which is described in more detail below and is shown in FIGS. 2, 3, 4, and 5). The HKEY_LOCAL_MACHINE Tree 131 contains data about the local computer system. This data includes hardware and operating system characteristics such as bus type, system memory, installed device drivers, and boot configuration data (also known as boot control data).

Each of the trees' nodes or keys are named. Each key may contain zero or more data items called value entries which are associated with the key. Keys are analogous to directories while value entries are analogous to files. A standard syntax used with the present invention defines names that begin with "\" as key names, and defines names that are followed by "=" as value entries, i.e., attributes of a key, as illustrated by way of example in FIG. 2

Physically, the registry 107 exists as a set of files on a hard disk (not shown). For the purpose of creating these files, the registry 107 is divided into sections called hives. Each hive maps directly to a file on the hard disk.

Figure 2:
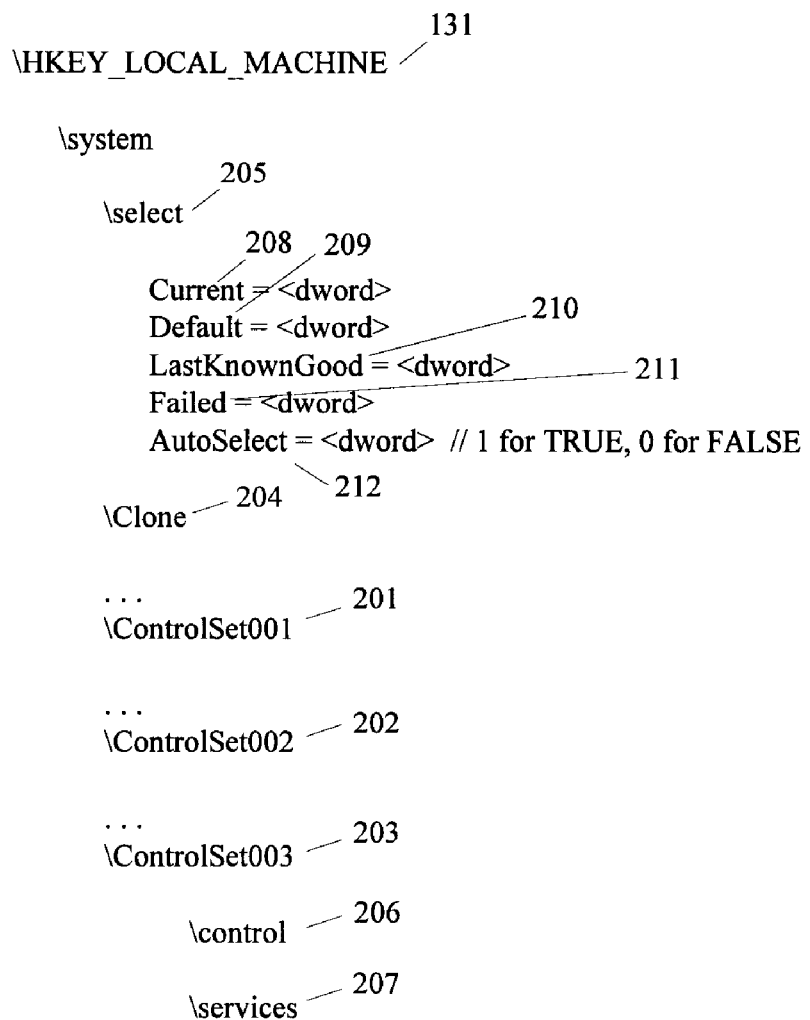
FIG. 2 is a preferred tree structure of the System hive for the registry of FIG. 1.

The data in the System hive of the registry 107 (i.e., HKEY_LOCAL_MACHINE Tree 131 System) is organized into control sets. A control set is simply an instance of a set of system parameters. FIG. 2 shows a preferred tree structure of the System hive. Each key in the System hive will now be described in more detail.

Each key named ControlSetnnn 201–203 describes a different configuration for the computer 105. Each ControlSetnnn preferably resides in a non-volatile store. The clone 204 is a copy of the ControlSetnnn that is currently used to attempt system boot, made very early in the boot process, before any change to the current control set has occurred. The clone 204 is preferably stored in volatile memory.

Each ControlSetnnn key has two subkeys, a Control subkey 206 (shown in more detail in FIG. 3) and a Services subkey 207 (shown in more detail in FIGS. 4 and 5). The Services subkey 207 lists all of the entities that can be loaded and set to running by the boot process on the computer 105. Each subkey name listed in FIG. 4 describes a different device driver to install on the computer system 100. A device driver is a software component that permits the computer system 100 to communicate with a device. For example, a printer driver is a device driver that translates computer data into a form understood by a printer (not shown) connected to the computer system 100 through the input/output unit 125. Those of ordinary skill in the art will understand that different computer systems will list different entities under the Services subkey 207. Likewise, different computer systems will assign different values to the value entries shown in FIG. 4.

The Control subkey 206 holds all of the miscellaneous values needed to boot the computer 105. For example, a value entry service_group_order 301 (FIG. 3) of the Control subkey 206 describes an order in which to invoke device drivers used by the computer system 100.

As will be described in more detail below, the ControlSetnn keys, along with the clone 204, prevent unusable configuration data from creating a computer that cannot be started. When unusable configuration data initially prevents the system from starting, the present invention searches a Select key 205 (discussed in more detail below) and retrieves the last control set that was successfully used to boot the computer 105. The present invention then uses the retrieved control set to complete the system boot procedure.

The Select key 205 maintains information about the control sets. The Select key 205 preferably contains the value entries Current 208, Default 209, LastKnownGood 210, Failed 211, and AutoSelect 212 (see FIG. 2).

Current 208 contains a data value that represents the control set that the computer 105 is currently booting from (i.e., a Current control set 208). Default 209 contains a data value that identifies a default control set (i.e., a Default control set 209) LastKnownGood 210 contains a data value that identifies a control set containing the data values that last successfully booted the computer 105 (i.e., a LastKnownGood control set 210). Failed 211, if set, identifies the control set that failed when the LastKnownGood control set 210 was last used (i.e., a Failed control set 211). AutoSelect 212 contains a data value that controls whether a LastKnownGood user interface menu will be displayed. The LastKnownGood user interface menu allows the user to choose whether to boot the computer 105 from the LastKnownGood control set 210 or by the Default control set 209.

To retrieve the Current control set 208, the Default control set 209, the LastKnownGood control set 210, or the Failed control set 211, the operating system 101 (1) retrieves the data value stored in the value entry Default 209, Current 208, Failed 211, or LastKnownGood 210, respectively, (2) formats this data value as a zero filled three digit string (e.g., 001), and (3) appends this three digit string to the end of the string "ControlSet" to arrive at the name of the control set to select (e.g., ControlSet001).

A discussion of how the components of the preferred operating system 101 interact to boot the computer 105 using the control set indicated by the value entry LastKnownGood 210 of the registry 107, will help illustrate the method and system of the present invention.

General Operation

In response to a user request to boot the computer 105 received via an input/output unit 125, the computer 105 executes a boot system program 109 of the operating system 101 to manage the system boot procedure for the computer 105. The BootSystem program 109, when executing on a central processing unit (CPU) 127, invokes a ChooseControlSet program 113 which chooses a set of configuration data (i.e., a control set) with which to boot the computer 105. The ChooseControlSet program 113 will either choose the Default control set 209 or the LastKnownGood control set 210 of the registry 107. The BootSystem program 109 then invokes an InitializeRegistry program 111 which, when executing on the CPU 127, retrieves configuration data for the computer 105 and stores the retrieved configuration data in the registry 107. Next, the BootSystem program 109 invokes a LoadDeviceDrivers program 121 which, when executing on the CPU 127, attempts to load and initialize a set of device drivers listed in the chosen control set. FIG. 1 shows a state of the system 101 after the device drivers 129 have been loaded into computer memory 103. If any of the device drivers should fail to load or initialize, then the LoadDeviceDrivers program 121 decides whether the system boot procedure currently underway should continue in spite of the failure to properly initialize the device driver, or whether a new system boot procedure should be initiated using the LastKnownGood control set 210 of the registry 107.

If a decision is made to reboot the computer 105 using the LastKnownGood control set 210 then the system boot procedure is reinitiated using the configuration data stored in the LastKnownGood control set 210. Upon a successful boot of the computer 105, using either control set, the BootSystem program 109 invokes the UpdateRegistry program 123. In response to a successful boot from the Default control set 209, the UpdateRegistry program 123 makes a new LastKnownGood control set 210 that is equivalent to the Default control set 209 which successfully booted the computer 105. The method UpdateRegistry, in response to a successful boot of the computer 105 using the LastKnownGood control set 210, causes the Default control set 209 to be set to the Current control set 208 that successfully booted the system, and creates a new LastKnownGood control set 210 that is equivalent to the Current control set 208 that successfully booted the computer 105. In this way the present invention ensures that the computer 105 will successfully boot even after some configuration data in the Default control set 209 has become unusable.

Flow Diagrams

Figure 6:
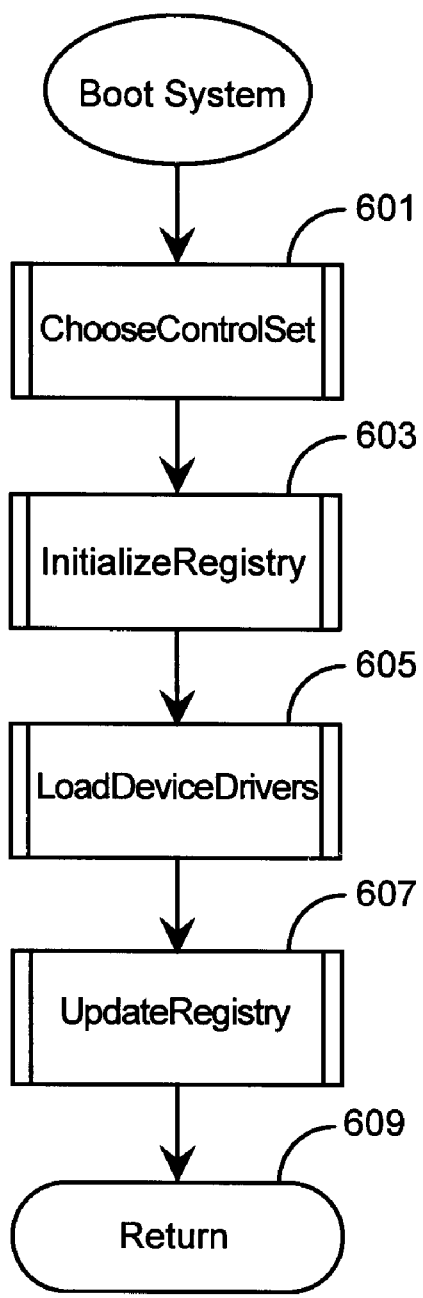
FIG. 6 is a flow diagram of the method BootSystem for the system of FIG. 1.
Figure 7:
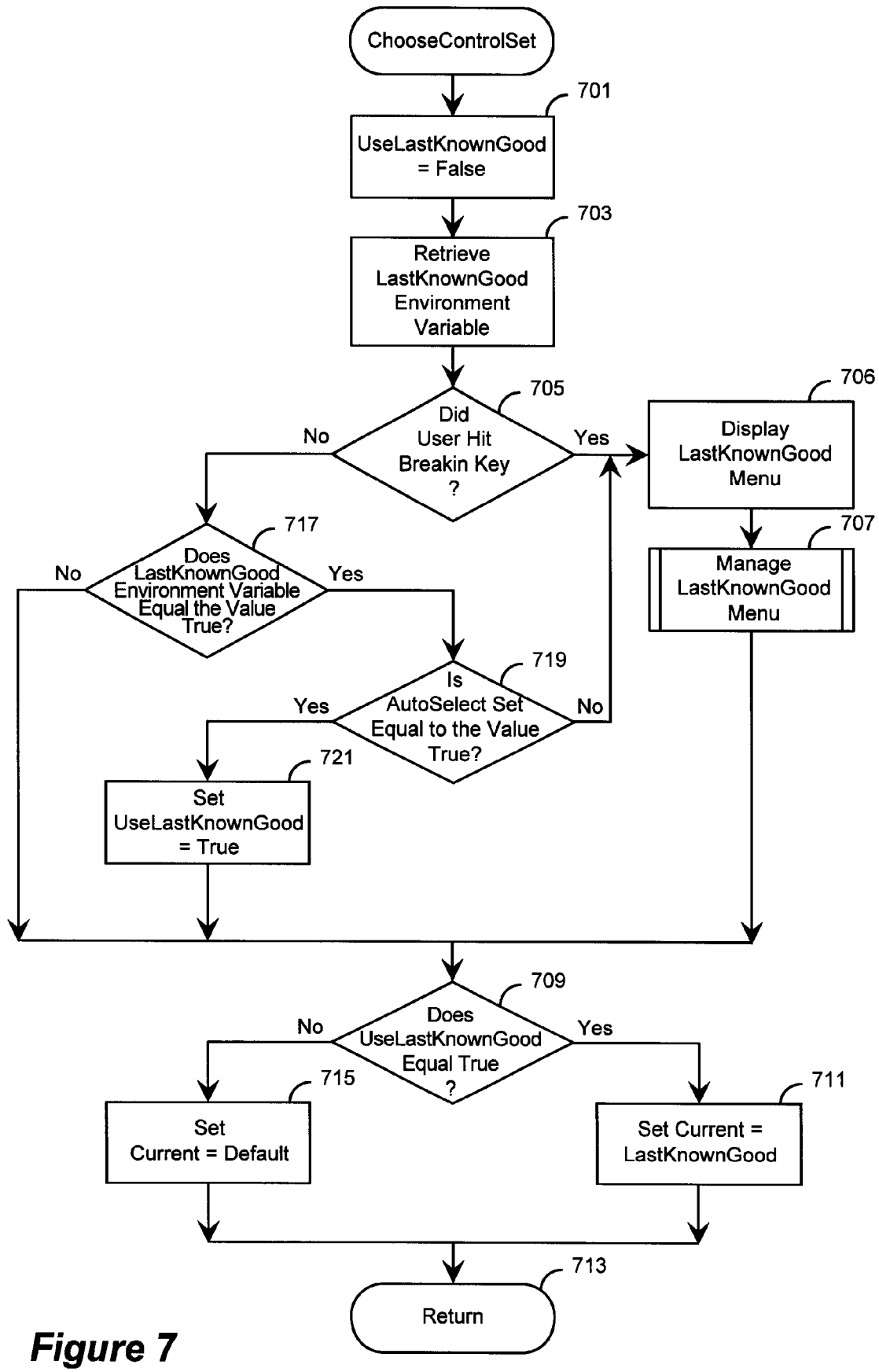
FIG. 7 is a flow diagram of a method ChooseControlSet for the system of FIG. 1.
Figure 8:
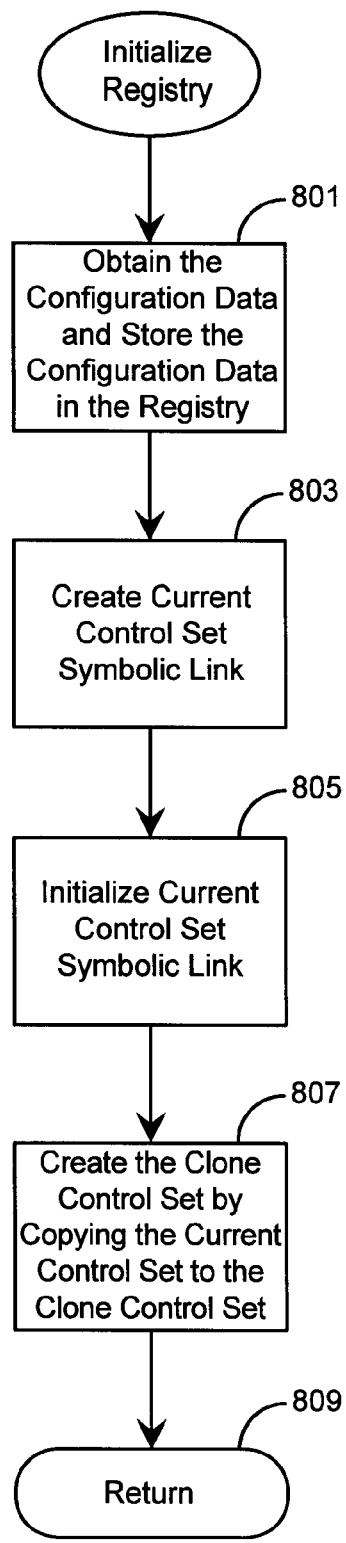
FIG. 8 is a flow diagram of the method InitializeRegistry for the system of FIG. 1.
Figure 9:
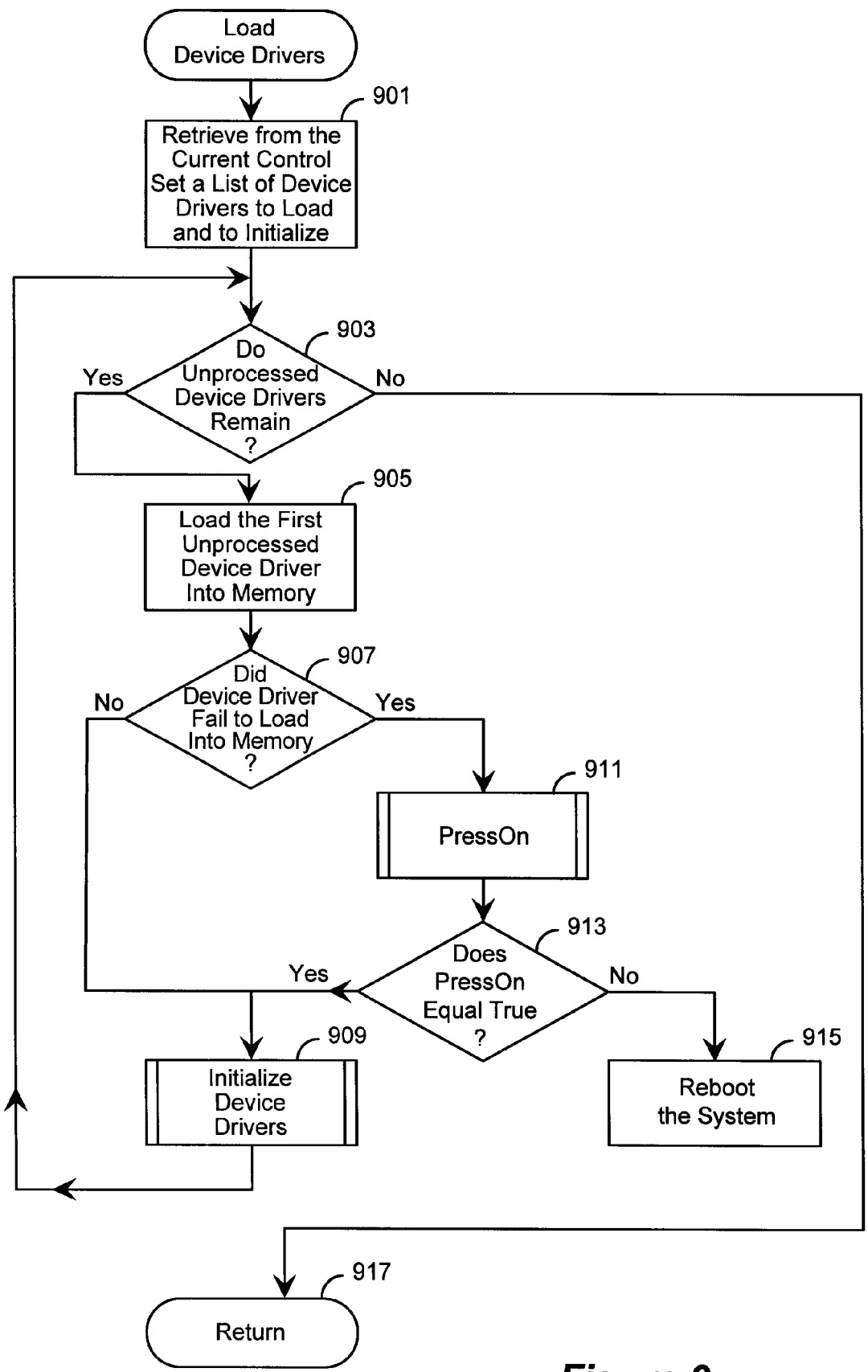
FIG. 9 is a flow diagram of a method LoadDeviceDrivers for the system of FIG. 1.

FIG. 6 is a flow diagram of the method BootSystem which controls the system boot procedure for the computer 105. The method BootSystem is preferably performed by the BootSystem program 109. In step 601 the method BootSystem calls the method ChooseControlSet which chooses a set of configuration data (i.e., a control set) with which to boot the computer 105. The method ChooseControlSet will choose either the Default control set 209 or the LastKnownGood control set 210 of the registry 107. The method ChooseControlSet is discussed in more detail below and is shown in FIG. 7. In step 603 the method BootSystem calls the method InitializeRegistry which retrieves configuration data for the computer 105 and stores the retrieved configuration data in the registry 107. The stored configuration data is used to boot the computer 105. The method InitializeRegistry is discussed in more detail below and is shown in FIG. 8. Once the proper control set has been chosen and the registry has been initialized, the method BootSystem, in step 605, calls the method LoadDeviceDrivers. The method LoadDeviceDrivers loads into the computer memory 103 and initializes a set of device drivers listed in the chosen control set. If any of the device drivers should fail to load or initialize then the method LoadDeviceDrivers decides whether the currently executing system boot procedure should continue in spite of the failure to properly load or initialize the device driver, or whether a new system boot procedure should be initiated using the LastKnownGood control set 210 of the registry 107. The method LoadDeviceDrivers is discussed in more detail below and is shown in FIG. 9.

Upon a successful boot of the computer 105, using either control set, the method BootSystem, in step 607, invokes the method UpdateRegistry. The method UpdateRegistry, in response to a successful boot of the computer 105 using the LastKnownGood control set 210, causes the Default control set 209 to be set to the Current control set 208 that successfully booted the system, and creates a new LastKnownGood control set 210 that is equivalent to the Current control set 208 that successfully booted the computer 105. The method UpdateRegistry, in response to a successful boot of the computer 105 from the Default control set 209, creates a new LastKnownGood control set 210 that is equivalent to the Current control set 208 which successfully booted the computer 105. In this way the present invention ensures that the computer 105 will successfully boot even after some configuration data in the Default control set 209 has become unusable. In step 609, the method BootSystem ends processing. However, processing on the computer 105, which is unrelated to the method BootSystem, can continue.

FIG. 7 is a flow diagram of the method ChooseControlSet which chooses a set of configuration data (i.e., a control set) with which to boot the computer 105. The method ChooseControlSet will either choose the Default control set 209 or the LastKnownGood control set 210 of the registry 107. The method ChooseControlSet is preferably performed by the ChooseControlSet program 113 of the operating system 101.

In step 701 the method ChooseControlSet sets the variable UseLastKnownGood equal to the value False. The variable UseLastKnownGood is set to True when the LastKnownGood control set 210 of the registry 107 is to be used to boot the computer 105. The variable UseLastKnownGood is set to False when the Default control set 209 of the registry 107 is to be used to boot the computer 105. In step 703, the method ChooseControlSet retrieves a LastKnownGood environment variable. The LastKnownGood environment variable is set to True when the immediately previous attempt to boot the computer 105 failed using the Default control set 209 of the registry 107, else the LastKnownGood environment variable is set to the value False. The LastKnownGood environment variable is preferably stored in a non-volatile storage medium.

Figure 12:
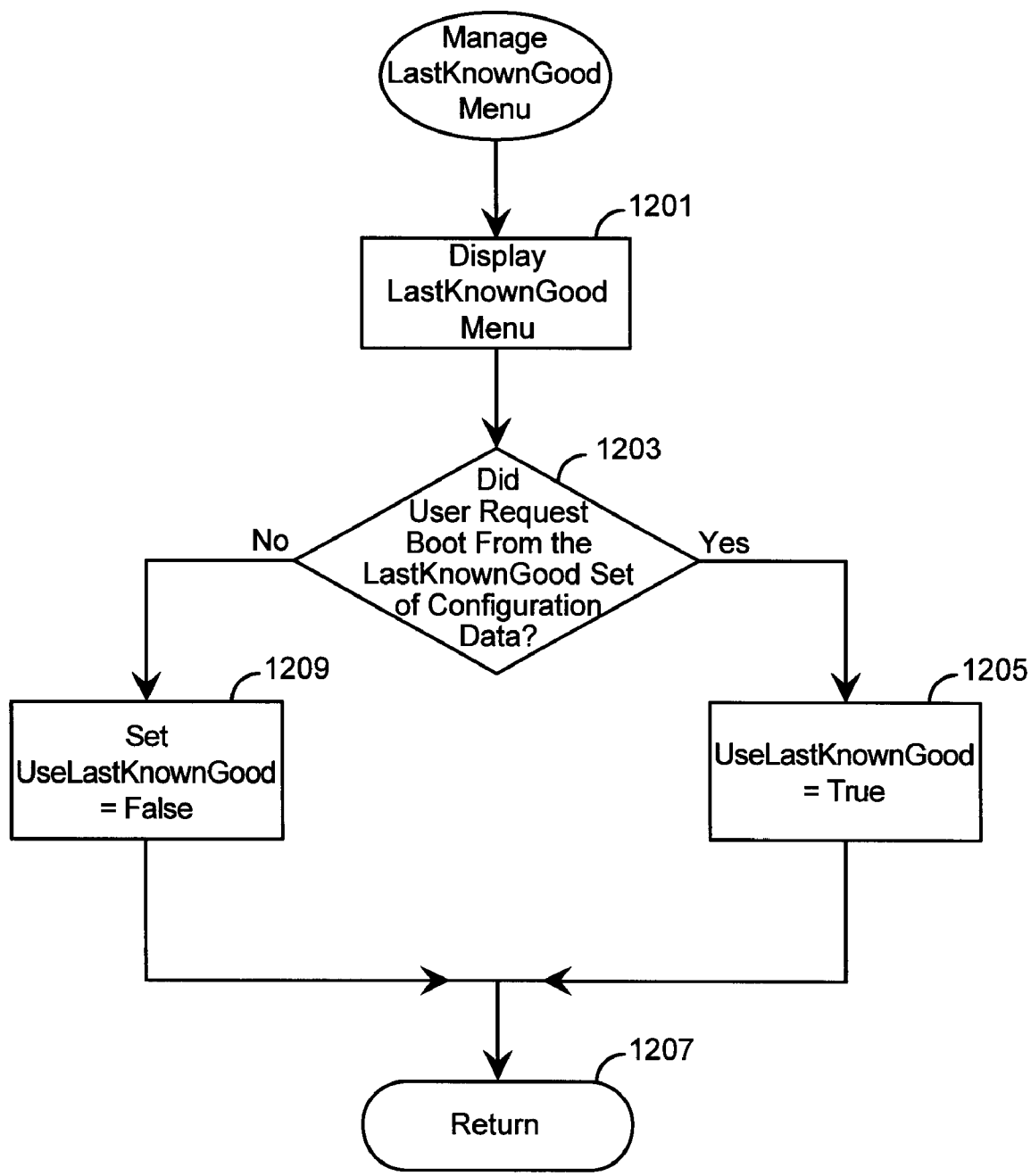
FIG. 12 is a flow diagram of a method ManageLast-KnownGoodMenu for the system of FIG. 1.

In step 705 the method ChooseControlSet determines if the user of the computer 105 entered a breakin key. The breakin key indicates to the method ChooseControlSet that the user wants to view a LastKnownGood user interface menu which gives the user of the computer 105 the option of booting the computer 105 from the LastKnownGood control set or booting the computer 105 from the Default control set. In the preferred embodiment the breakin key is the space-bar and is invoked by holding down the space-bar. If the method determines that the user did hit the breakin key then, in step 706, the method ChooseControlSet displays a LastKnownGood user interface menu. The LastKnownGood user interface menu is shown in FIG. 15. The LastKnownGood user interface menu provides the user of the computer 105 with options for booting the computer 105. Using the LastKnownGood user interface menu of FIG. 15, the user can choose to boot the computer 105 using the Default control set 209 of the registry 107 or the LastKnown Good control set 117 of the registry 107. Upon completion of step 706, the method ChooseControlSet calls the method ManageLastKnownGoodMenu which processes data entries from the user which were entered in response to LastKnownGood menu options. The method ManageLastKnownGood is discussed in more detail below and is shown in FIG. 12. Upon completion of step 707 the method ChooseControlSet, in step 709, determines if the variable UseLastKnownGood is set equal to the value True. If the variable UseLastKnownGood is set equal to the value True then in step 711, the method ChooseControlSet sets the value entry Current 208 of the registry 107 equal to the control set indicated by the value entry LastKnownGood 210 of the registry 107. In this way the control set indicated by the value entry LastKnownGood 210 is used to boot the system. Upon completion of step 711 the method ChooseControlSet in step 713 returns processing control to the method BootSystem of FIG. 6.

Returning to the discussion of step 709, if the method ChooseControlSet determines that the variable UseLastKnownGood is set equal to the value False then in step 715 the method sets the value entry Current 208 equal to the value entry Default 209. Upon completion of step 715, the method ChooseControlSet, in step 713, returns processing control to the method BootSystem of FIG. 6.

Returning to the discussion of step 705, if the user did not hit the breakin key then in step 717 the method ChooseControlSet determines whether the LastKnownGood environment variable is set equal to the value True. If the LastKnownGood environment variable is set equal to the value False, then processing continues with steps 709, 711, 713, and 715 (discussed above).

Returning to the discussion of step 717, if the LastKnownGood environment variable is set equal to the value True then in step 719 the method determines whether the value entry AutoSelect 212 of the registry 107 is set equal to the value True. The value entry AutoSelect 212 controls whether the LastKnownGood user interface menu is displayed. If AutoSelect 212 is set equal to the value False then steps 701, 707, 708, 711, 713, and 715 are performed as discussed above.

If the value entry AutoSelect 212 is set equal to the value True then in step 721 the variable UseLastKnownGood is set to the value True. After completion of step 721, steps 709–715 are performed as discussed above FIG. 8 is a flow diagram of the method InitializeRegistry which obtains configuration data for the computer 105 and stores the obtained configuration data in the registry 107. The stored configuration data is used by the present invention to successfully boot the computer 105. The method InitializeRegistry is preferably performed by the InitializeRegistry program 111 of the operating system 101.

In step 801 the method InitializeRegistry obtains configuration data for the computer 105 and stores the configuration data in the registry 107. Software configuration data is read form the System hive file and hardware configuration data is extracted from the system by computation. The stored configuration data is later used to boot the computer 105. In step 803 the method InitializeRegistry creates a symbolic link to the control set indicated by the value entry Current 208 of the registry 107. A symbolic link is a way of making all references to a particular key with a defined name ("CurrentControlSet") actually refer to a different key ("ControlSetnnn") with a different name. In step 805 the method InitializeRegistry initializes the symbolic link by creating a link from the key "CurrentControlSet" to the key at the root of the ControlSetnnn control set used to boot the system. In step 807 the method InitializeRegistry creates the clone 204 by copying the Current control set 208 to the clone 204. Upon completion of step 807, the method InitializeRegistry, in step 809, returns processing control to the method BootSystem (FIG. 6).

FIG. 9 is a flow diagram of the method LoadDeviceDrivers which loads into the computer memory 103 and initializes a set of device drivers listed in the control set currently being used to boot the computer 105. If any of the device drivers should fail to load into the computer memory 103 or should fail to initialize then a decision to continue the current boot process or to reboot the system using the LastKnownGood control set is made. The method LoadDeviceDrivers is preferably performed by the LoadDeviceDrivers program 121 of the operating system 101.

Figure 10:
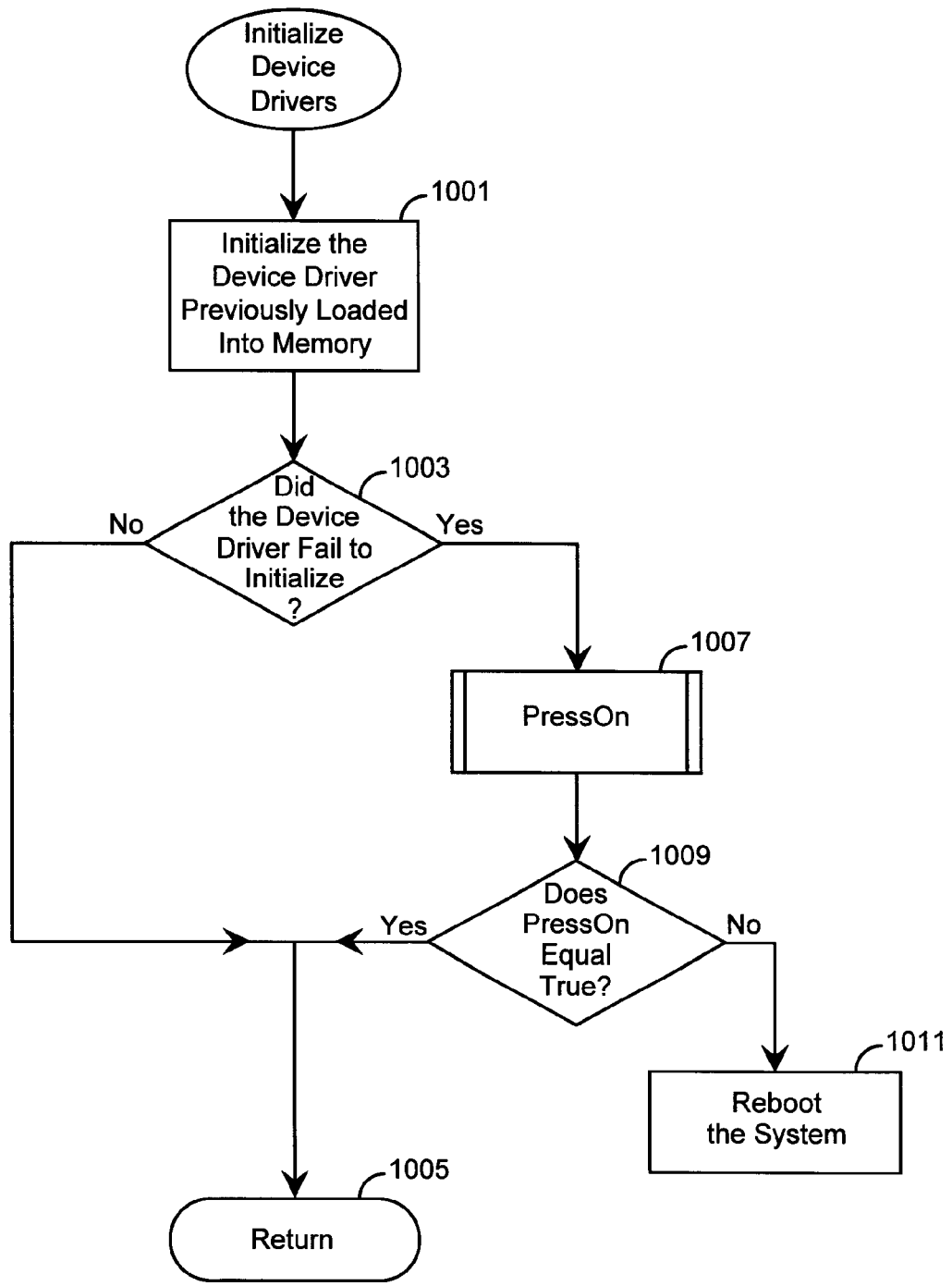
FIG. 10 is a flow diagram of a method InitializeDevice-Drivers for the system of FIG. 1.

In step 901 the method LoadDeviceDrivers retrieves, from the control set indicated by the value entry Current 208, a list of device drivers to load into the computer memory 103 and to initialize. In step 903, the method determines if any unprocessed device drivers remain. If unprocessed device drivers do remain, then in step 905 the method loads the first unprocessed device driver into the computer memory 103. In step 907, the method determines if the device driver failed to load into the computer memory 103. If the device driver properly loaded into the computer memory 103, then in step 909 the method LoadDeviceDrivers calls the method InitializeDeviceDrivers which initializes the device driver loaded into the computer memory 103. The method LoadDeviceDrivers is discussed in detail below and is shown in FIG. 10. Upon completion of step 909, processing continues with step 903.

Figure 13:
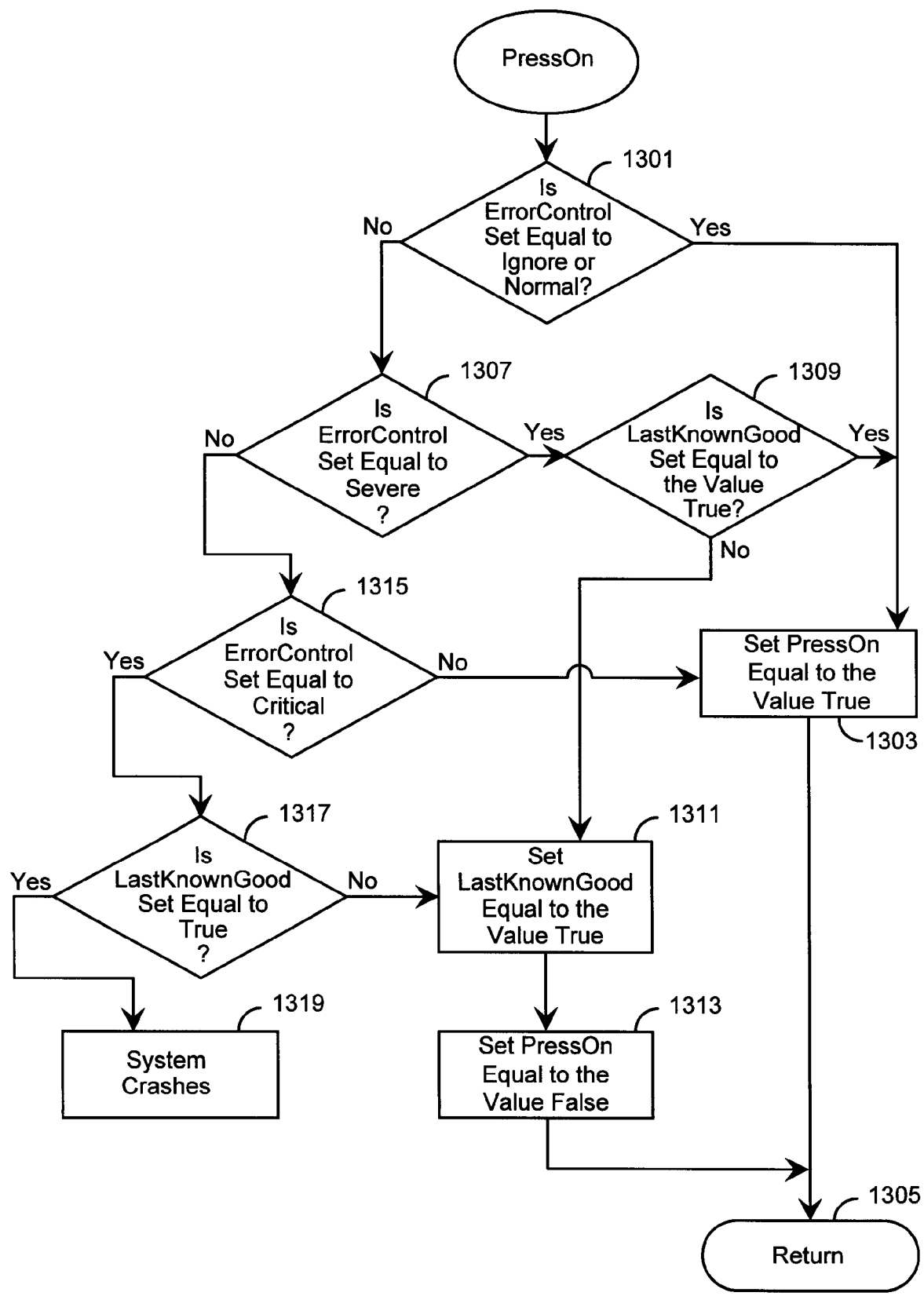
FIG. 13 is a flow diagram of a method PressOn for the system of FIG. 1.

Returning to the discussion of step 907, if the device driver failed to load into the computer memory 103, then in step 911 the method LoadDeviceDrivers calls the method PressOn which determines whether the system boot procedure currently underway should continue in spite of a failure to properly load or initialize a device driver or whether a new system boot procedure should be initiated using the LastKnownGood control set 210 of the registry 107. The method PressOn is discussed in detail below and is shown in FIG. 13. Upon completion of step 911, the method LoadDeviceDrivers, in step 913, determines if the variable PressOn which was returned from the method PressOn is set equal to the value True. If the variable PressOn is set equal to the value False, then in step 915, the method LoadDeviceDrivers reboots the system. However, if the method LoadDeviceDrivers determines that the variable PressOn is set equal to the value True, then in step 909, the method LoadDeviceDrivers calls the method InitializeDeviceDrivers which initializes the device driver loaded into the computer memory 103. The method InitializeDeviceDrivers is discussed in detail below and is shown in FIG. 10. Upon completion of step 909 processing continues with step 903.

If in step 903 the method LoadDeviceDrivers determines that all of the device drivers have been processed, then in step 917 the method LoadDeviceDrivers returns processing control to the method BootSystem (FIG. 6).

FIG. 10 is a flow diagram of the method InitializeDeviceDrivers which initializes the device driver previously loaded into the computer memory 103 in the method LoadDeviceDrivers (FIG. 9). The method InitializeDeviceDrivers is preferably performed by the InitializeDeviceDrivers program 139 of the operating system 101.

In step 1001 the method InitializeDeviceDrivers initializes the device driver previously loaded into the memory 103. In step 1003 the method InitializeDeviceDrivers determines if the loaded device driver failed to initialize properly. If the device driver initialized properly then in step 1005, the method InitializeDeviceDrivers returns processing control to the method LoadDeviceDrivers (FIG. 9).

Returning to the discussion of step 1003, if the device driver did fail to initialize properly then in step 1007, the method InitializeDeviceDrivers determines whether the boot should proceed by calling the method PressOn. The method PressOn is discussed in more detail below and is shown in FIG. 13.

Upon completion of step 1007, the method InitializeDeviceDrivers, in step 1009, determines whether the variable PressOn which was returned from the method PressOn is set equal to the value True. If the variable PressOn is set equal to the value False, then the method InitializeDeviceDrivers, in step 1011, reboots the system.

Returning to the discussion of step 1009, if the variable PressOn returned from the method PressOn is set equal to the value True, then in step 1005, the method InitializeDeviceDrivers returns processing control to the method LoadDeviceDrivers of FIG. 9.

Figure 11:
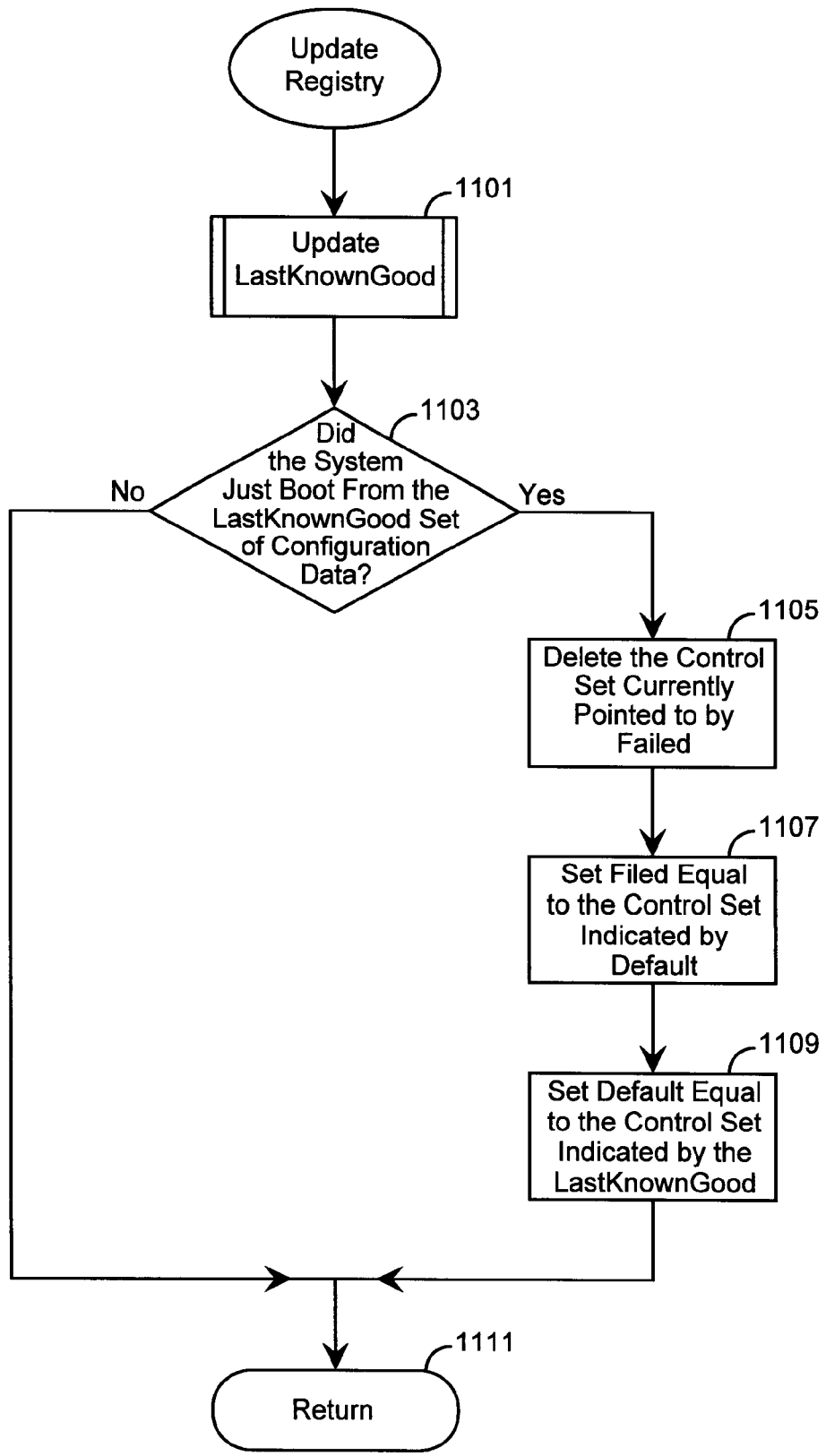
FIG. 11 is a flow diagram of a method UpdateRegistry for the system of FIG. 1.

FIG. 11 is a flow diagram of the method UpdateRegistry which, in response to a successful boot of the computer 105 using the LastKnownGood control set 210, causes the Default control set 209 to be set to the Current control set 208 that successfully booted the system, and creates a new LastKnownGood control set 210 that is equivalent to the Default control set 209 that successfully booted the computer 105. In response to a successful boot from the Default control set 209, the method UpdateRegistry creates a new LastKnownGood control set 210 that is equivalent to the Current control set 208. In this way the present invention ensures that the computer 105 will successfully boot even after some configuration data in the Default control set 209 has been unusable.

Figure 14:
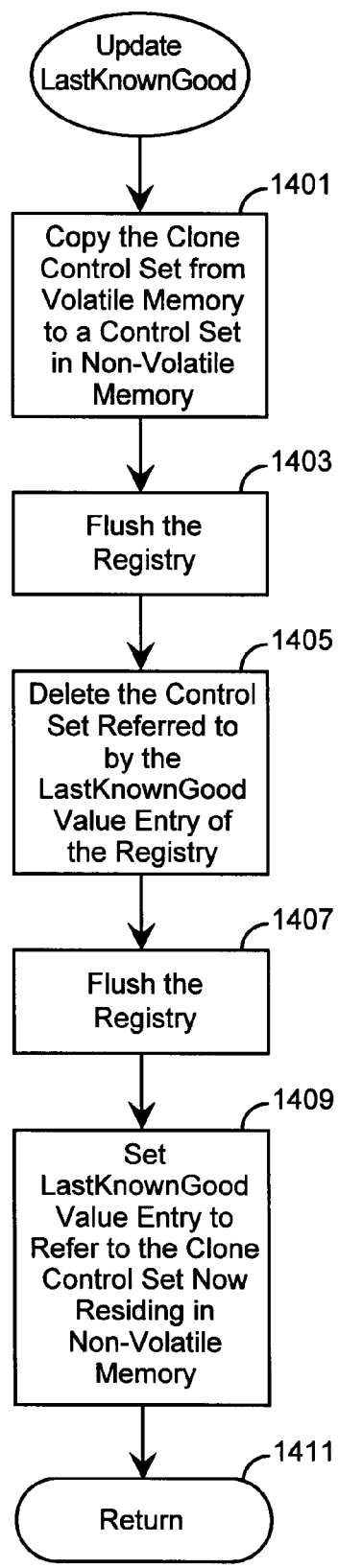
FIG. 14 is a flow diagram of a method UpdateLastKnown-Good for the system of FIG. 1.

In step 1101 the method UpdateRegistry calls the method UpdateLastKnownGood which updates the value entry LastKnownGood 210 of the registry 107 to point to the control set in the registry 107 which last successfully booted the computer 105. The method UpdateLastKnownGood is discussed in more detail below and is shown in FIG. 14. Upon completion of step 1101 the method UpdateRegistry, in step 1103, determines whether the computer 105 just successfully booted from the control set indicated by the value entry LastKnownGood 210 of the registry 107. System boot is preferably considered successful or unsuccessful based on a default set of criteria. For example, if the system appeared to the operating system 101 to properly boot but in fact failed because of a problem that the operating system cannot detect (e.g., the screen is unreadable because the wrong video mode is set) then the current boot is not considered successful. However, in the preferred embodiment, the system boot is considered successful if two criteria are met. First, the system must attempt to start all relevant device drivers. If any driver fails to start, AND its ErrorControl value is Severe or Critical, the boot will NOT be declared good. Every device driver has a named node under the Services subkey 207 of the System hive, and every driver's node contains the value entry ErrorControl 401 (see FIG. 4). ErrorControl has one of four values: (1) Ignore, (2) Normal, (3) Severe, and (4) Critical. The value Ignore indicates that the current system boot should continue, and that even if the driver fails to initialize, the user is not notified of the failure in the form of a pop-up message. The value Normal indicates that the current system boot should continue. However, in the preferred embodiment a message is displayed to the user indicating that an error has occurred during system boot. The value Severe indicates that the system should be rebooted using the LastKnownGood control set 210, unless the system is currently being booted from the LastKnownGood control set 210, in which case the current boot from the LastKnownGood control set 210 should continue. The value Critical indicates that if the system boot is currently from the control set identified by the value entry Default 209, then the system should be rebooted using the LastKnownGood control set 210. The value Critical also indicates that if the system boot is currently from the LastKnownGood control set 210 that the system boot fails.

Second, at least one user must successfully logon to the system. While the set of criteria set forth above is the default set of criteria, the preferred embodiment also allows the user to define a set of criteria for successful boot different than the default set discussed above.

If the computer 105 was successfully booted from the LastKnownGood control set then, in step 1105, the method deletes the control set currently indicated by the value entry Failed 211 of the registry 107. In step 1107 the method sets the value entry Failed 211 equal to the data value contained in the value entry Default 209. In step 1109 the method sets the value entry Default 209 equal to the data value of the value entry LastKnownGood 210 of the registry 107. In step 1111 the method UpdateRegistry returns processing control to the method BootSystem (FIG. 6).

Returning to the discussion of step 1103, if the computer 105 successfully booted from a control set other than the control set indicated by the value entry LastKnownGood 210 then the method UpdateRegistry, in step 1111, returns processing control to the method BootSystem (FIG. 6).

FIG. 12 is a flow diagram of the method ManageLastKnownGoodMenu which processes user requests entered in response to options presented in the LastKnownGood user interface menu. The method ManageLastKnownGoodMenu is preferably performed by the ManageLastKnownGood menu program 133 of FIG. 1. In step 1201 the method ManageLastKnownGood displays the LastKnownGood user interface menu of FIG. 15. In step 1203 the method determines whether the user of the computer 105 entered a request in response to LastKnownGood menu options to boot the computer 105 from the control set referred to by the value entry LastKnownGood 210 of the registry 107. If the user did enter a request to boot the computer 105 from the control set referred to by the value entry LastKnownGood 210 then in step 1205 the method sets the variable UseLastKnownGood equal to the value True. In step 1207 the method ManageLastKnownGoodMenu returns processing control to the method ChooseControlSet (FIG. 7).

Returning to the discussion of step 1203, if the user entered a request in response to the LastKnownGood menu to boot the system from the control set referred to by the value entry Default 209 of the registry 107, then in step 1209, the method sets the variable UseLastKnownGood equal to the value False. Upon completion of step 1209 the method ManageLastKnownGoodMenu, in step 1207, returns processing control to the method ChooseControlSet (FIG. 7).

FIG. 13 is a flow diagram of the method PressOn which determines whether the system boot procedure currently underway should continue in spite of a failure to properly load or initialize at least one device driver or whether a new system boot procedure should be initiated using the LastKnownGood control set 210 of the registry 107. The method PressOn determines whether the current system boot procedure should continue by testing both a value entry ErrorControl 401 (FIG. 4) associated with each device driver, and by testing a LastKnownGood environment variable. If the driver's ErrorControl is Ignore or Normal, then the boot continues. If the driver's ErrorControl is Severe, and the system is booting from the Default control set 209, the boot is failed and the system should be rebooted using the LastKnownGood control set to retry the boot. If ErrorControl is Severe, and the system is booting from the LastKnownGood control set 210, the boot continues. If ErrorControl is Critical, and the system is booting from the Default control set 209, the boot is failed, and the system reverts to the LastKnownGood control set on the next boot. If the ErrorControl is Critical, and the system is booting from the LastKnownGood control set 210, the boot fails entirely. A driver's ErrorControl value entry is set when the driver is installed, but can be programmatically changed at anytime while the system is running.

The LastKnownGood environment variable indicates that the system failed to boot from the Default control set 209 of the registry 107 and should be rebooted using the LastKnownGood control set 210 of the registry 107. The LastKnownGood environment variable is preferably stored in non-volatile memory. The method PressOn is preferably performed by the PressOn program 135 of FIG. 1.

In step 1301, the method PressOn determines whether the value entry ErrorControl is set equal to the value Ignore or the value Normal. If the value entry ErrorControl is set equal to the value Normal or Ignore, then in step 1303 the method PressOn sets the variable PressOn equal to the value True. Upon completion of step 1303, the method PressOn returns to its caller (i.e., the method LoadDeviceDrivers of FIG. 9 or the method InitialiazeDeviceDrivers of FIG. 10).

Returning to the discussion of step 1301, if the value entry ErrorControl is not set equal to the value Normal or Ignore, then in step 1307 the method PressOn determines whether the value entry ErrorControl is set equal to the value Severe. If the value entry ErrorControl is set equal to the value Severe, then in step 1309 the method PressOn determines whether the LastKnownGood environment variable is set equal to the value True. If the LastKnownGood environment variable is set equal to the value True, then in step 1303 the method PressOn sets the variable PressOn equal to the value True. In step 1305, the method PressOn returns to its caller.

Returning to the discussion of step 1309, if the LastKnownGood environment variable is set equal to the value False, then in step 1311, the method PressOn sets the LastKnownGood environment equal to the value True. In step 1313, the method PressOn sets the variable PressOn equal to the value False. Upon completion of step 1313, the method PressOn, in step 1305, returns to its caller.

Returning to the discussion of step 1307, if the value entry ErrorControl is not set equal to the value Severe, then in step 1315, the method PressOn determines whether the value entry ErrorControl is set equal to the value Critical. If the value entry ErrorControl is not set equal to the value Critical, then in step 1303, the method PressOn sets the variable PressOn equal to the value True. Upon completion of step 1303, the method PressOn, in step 1305, returns to its caller.

Returning to the discussion of step 1315, if the value entry ErrorControl is set equal to the value Critical, then in step 1317, the method PressOn determines whether the LastKnownGood environment variable is set equal to the value True. If the LastKnownGood environment variable is set equal to the value False, then in step 1311, the method PressOn sets the LastKnownGood environment variable equal to the value True. In step 1313, the method sets the variable PressOn equal to the value False. Upon completion of step 1313, the method PressOn, in step 1305, returns to its caller.

Returning to the discussion of step 1317, if the method determines that the LastKnownGood environment variable is set equal to the value True, then in step 1319, the system crashes.

FIG. 14 is a flow diagram of the method UpdateLastKnownGood whose primary task is to reset the value entry LastKnownGood 210 to point to a copy of the clone 204 in order to update the LastKnownGood value entry after a successful system boot using the Current control set 208 of the registry 107. The method UpdateLastKnownGood is preferably performed by the UpdateLastKnownGood program 137 of FIG. 1.

In step 1401 the method UpdateLastKnownGood copies the clone 204 from volatile memory to non-volatile memory. In step 1403 the method flushes the registry 107. A flush of the registry 107 forces all changes made to a hive, for example, the System hive of FIG. 2, since the last flush, to be committed to disk. The flush is preferably performed in such a way that either all changes occur, or no changes occur.

In step 1405 the method deletes the control set referred to by the value entry LastKnownGood 210 of the registry 107. In step 1407 the method flushes the registry 107. In step 1409 the method sets the value entry LastKnownGood 210 of the registry 107 to refer to the copy of the Clone control set now residing in nonvolatile memory. In step 1411 the method UpdateLastKnownGood returns processing control to the method UpdateRegistry (FIG. 11).

Those of ordinary skill in the art will understand that other system architectures can be used to implement the methods of the present invention described above, including, but not limited to, a network in which a plurality of computers are coupled with file servers to share access to data among computer users through a data communications network.

While the discussion herein focuses on device drivers, those of ordinary skill in the art will recognize that the scope of the discussion is not so limited but applies equally to file systems and user mode program services.

It will be appreciated that, although a specific embodiment of the invention has been described herein for purposes of illustration, various modifications may be made without departing from the spirit and scope of the invention.

What is claimed is:

1. A method for configuring a computer system, the computer system having a plurality of devices and having a multiplicity of device drivers, each device driver for communicating with a device, the method comprising the computer-implemented steps of:

retrieving a first set of configuration data, the first set of configuration data having an association between devices and device drivers;

for each device driver associated with a device in the retrieved first set of configuration data,
      loading the associated device driver; and
      initializing the loaded device driver wherein the device driver returns an indication whether the device driver configured correctly;

automatically determining without receiving any user input whether each device driver associated with a device in the retrieved first set of configuration data initialized properly based on the returned indications; and when it is determined that a device driver did not initialize properly,
      retrieving a second set of configuration data, the second set of configuration data having an association between devices and device drivers such that, when the second set of configuration data was previously used when configuring the computer system, each device driver initialized properly; and
      for each device driver associated with a device in the retrieved second set of configuration data,
         loading the associated device driver; and
         initializing the loaded device driver.

2. The method of claim 1 including the step of:
   when it is determined that each device driver did initialize properly, updating the second set of configuration data so that it is equivalent to the first set of configuration data.

3. The method of claim 1 wherein the second set of configuration data was a set of configuration data that, when most recently configuring the computer system, each device driver initialized properly.

4. A method for booting a computer system, the computer system having a computer program and having a first and second set of configuration data, the first and second set of configuration data each specifying a configuration for the computer program, the second set of configuration data being a set of configuration data that was used when the computer program was previously booted successfully, the method comprising the computer-implemented steps of:

retrieving the first set of configuration data;

configuring the computer program in accordance with the retrieved first set of configuration data;

automatically determining without receiving input from a user whether the computer program was successfully configured in accordance with the retrieved first set of configuration data;

when it is determined that the computer program was not successfully configured in accordance with the retrieved first set of configuration data, automatically performing the steps of:
      retrieving the second set of configuration data; and
      configuring the computer program in accordance with the retrieved second set of configuration data; and executing the configured computer program.

5. The method of claim 4 including the step of:
   when it is determined that the computer program was successfully configured in accordance with the retrieved first set of configuration data, updating the second set of configuration data so that it is equivalent to the first set of configuration data.

6. The method of claim 4 wherein the step of retrieving the second set of configuration data retrieves a set of configuration data used to successfully configure the computer program when the computer system was last booted.

7. The method of claim 4 wherein the computer program is an operating system, wherein the computer system has a plurality of the devices, wherein the first and second set of configuration data specifies a device driver for each device, and wherein the computer program is configured with the specified device drivers.

8. A computer-readable medium containing instructions for causing a computer system to be configured, the computer system having a plurality of devices and having a multiplicity of device drivers, each device driver for communicating with a device, by the steps of:

retrieving a first set of configuration data, the first set configuration data having an association between devices and device drivers;

for each device driver associated with a device in the retrieved first set of configuration data,
      loading the associated device driver; and
      initializing the loaded device driver wherein the device driver returns an indication whether the device driver configured correctly;

automatically determining without receiving any user input whether each device driver associated with a device in the retrieved first set of configuration data initialized properly based on the returned indications; and when it is determined that a device driver did not initialize properly,
      retrieving a second set of configuration data, the second set of configuration data having an association between devices and device drivers such that, when the second set of configuration data was previously used when configuring the computer system, each device driver initialized properly; and
      for each device driver associated with a device in the retrieved second set of configuration data, loading the associated device driver; and initializing the loaded device driver.

9. The computer-readable medium of claim 8 containing instructions to update the second set of configuration data so that it is equivalent to the first set of configuration data when it is determined that each device driver did initialize properly.

10. The computer-readable medium of claim 8 wherein the second set of configuration data was a set of configuration data that, when most recently configuring the computer system, each device driver initialized properly.

11. A system for booting a computer system, the computer system having a computer program and having a first and second set of configuration data, the first and second set of configuration data each specifying a configuration for the computer program, the second set of configuration data being a set of configuration data that was used when the computer program was previously booted successfully, the system comprising:

means for retrieving the first set of configuration data;

means for configuring the computer program in accordance with the retrieved first set of configuration data;

means for determining without receiving any user input whether the computer program was successfully configured in accordance with the retrieved first set of configuration data;

means for retrieving the second set of configuration data, and for configuring the computer program in accordance with the retrieved second set of configuration data when it is determined that the computer program was not successfully configured in accordance with the retrieved first set of configuration data; and means for executing the configured computer program.

12. The system of claim 10 including means for updating the second set of configuration data so that it is equivalent to the first set of configuration data when it is determined that the computer program was successfully configured in accordance with the retrieved first set of configuration data.

13. The system of claim 10 wherein the means for retrieving the second set of configuration data retrieves a set of configuration data used to successfully configure the computer program when the computer system was last booted.

14. The system of claim 10 wherein the computer program is an operating system, wherein the computer system has a plurality of the devices, wherein the first and second set of configuration data specifies a device driver for each device, and wherein the computer program is configured with the specified device drivers.

\* \* \* \* \*

UNITED STATES PATENT AND TRADEMARK OFFICE
CERTIFICATE OF CORRECTION

PATENT NO. : 6,529,966 B1  Page 1 of 1
APPLICATION NO. : 08/518852
DATED : March 4, 2003
INVENTOR(S) : Willman et al.

It is certified that error appears in the above-identified patent and that said Letters Patent is hereby corrected as shown below:

On the title page, item:
(57) Abstract:
Line 14:
"data as" should read --data that successfully booted the computer system, and storing the first set of configuration data as--.

Column 5
Line 14: "Current" should not begin a new paragraph.

Column 10
Line 17: "107to" should read --107 to--.

Column 16
Line 9:  "10" should read --11--.
Line 14: "10" should read --11--.
Line 19: "10" should read --11--.

Signed and Sealed this

Third Day of October, 2006

JON W. DUDAS
*Director of the United States Patent and Trademark Office*